(12) United States Patent
Velankar et al.

(10) Patent No.: US 12,545,852 B2
(45) Date of Patent: Feb. 10, 2026

(54) ODORANTS AND COMPOSITIONS COMPRISING ODORANTS

(71) Applicant: S H KELKAR AND COMPANY LIMITED, Maharashtra (IN)

(72) Inventors: Avdhoot D. Velankar, Mumbai (IN); Kedar Ramesh Vaze, Mumbai (IN); Mayur S. Mukim, Mumbai (IN); Vivek S. Gaware, Mumbai (IN)

(73) Assignee: S H KELKAR AND COMPANY LIMITED (IN)

( * ) Notice: Subject to any disclaimer, the term of this patent is extended or adjusted under 35 U.S.C. 154(b) by 519 days.

(21) Appl. No.: 18/014,465

(22) PCT Filed: Jul. 30, 2021

(86) PCT No.: PCT/IB2021/056955
§ 371 (c)(1),
(2) Date: Jan. 4, 2023

(87) PCT Pub. No.: WO2022/024054
PCT Pub. Date: Feb. 3, 2022

(65) Prior Publication Data
US 2023/0257679 A1    Aug. 17, 2023

(30) Foreign Application Priority Data

Jul. 31, 2020   (IN) .............................. 202021032931
Oct. 8, 2020    (EP) .................................... 20200761

(51) Int. Cl.
C11B 9/00      (2006.01)
C07D 307/79    (2006.01)
C07D 311/74    (2006.01)

(52) U.S. Cl.
CPC .......... *C11B 9/0076* (2013.01); *C07D 307/79* (2013.01); *C07D 311/74* (2013.01); *C11B 9/008* (2013.01)

(58) Field of Classification Search
CPC ..... C07D 311/74; C07D 307/79; C11B 9/008; C11B 9/0076

USPC ............................................ 512/13, 11, 8, 1
See application file for complete search history.

(56) References Cited

U.S. PATENT DOCUMENTS 4,233,226 A    11/1980   Takeda et al.
4,268,445 A    5/1981    Kropp et al.

FOREIGN PATENT DOCUMENTS

EP    2848611 A1       3/2015
WO    2014064716 A1    5/2014

OTHER PUBLICATIONS

Hombrecher et al, A photochemically-generated acyl-vinyloxy biradical as a synthetic precursor of a 2,3-dihydrofuran and a butyrolactone, 1986, J. Chem. Soc., Chem. Commun., 1477-1478 (Year: 1986).*
Hobel et al, 1990, Light induced conversion of 4,6,7,8-tetrahydro-2H-benzopyran-2,5(3H)-diones into 3,5,6,7-tetrahydrobenzofuran-4(2H)-ones in Methanol, Chem. Ber. 123, 101-105 (Year: 1990).*
European Patent Office; International Search Report and Written Opinion issued in Intl' Application No. PCT/2021IB/056955 dated Feb. 4, 2022; 15 pages.
Hornbrecher H. et al.; "Synthesis of 2,3,4,6,7,8-Hexahydro-5H-1-benzopyan-5-ones and 3 (6-Oxo-1, cyclohexenyl) alkanoic Acids by Reduction of 4,6,7,8-Tetrahydro-2H-1-benzopyran-2, 5 (3H) d iones"; Helvetica Chimica Acta, vol. 69, No. 7, Oct. 29, 1986; pp. 1681-1684, XP002802017; DOI: 10.1002/hlca.19860690723.
Horbel K. et al.; "Light Induced Conversion of 4,6,7,8-Tetrahydro-2H-benzopyran-2, 5 (3H)-d iones into 3,5,6,7-Tetrahydrobenzofuran-4 (2H)—ones in Methanol"; Chemische Berichte, vol. 123, No. 1; Jan. 1, 1990; pp. 101-105; XP002802018; DOIL: 10.1002/cber.19901230121.

\* cited by examiner

*Primary Examiner* — Jessica Whiteley
(74) *Attorney, Agent, or Firm* — MASCHOFF BRENNAN

(57) ABSTRACT

The present invention relates to substituted hexahydro-5H-chromen-5-one and/or substituted tetrahydrobenzofuran-4(2H)-one derivatives which are useful as fragrance or flavor materials.

17 Claims, No Drawings

ODORANTS AND COMPOSITIONS COMPRISING ODORANTS

FIELD OF THE INVENTION

The present invention relates to new classes of odorous compounds denoted by formula (I) which represent substituted hexahydro-5H-chromen-5-one and/or substituted tetrahydrobenzofuran-4(2H)-one derivatives thereof which are useful as fragrance or flavor materials in particular in providing damascone-type or damascenone-type, e.g. fruity, minty, woody, powdery, ambery and/or tobacco-like notes to perfume, aroma or deodorizing/masking compositions. The present invention also relates to fragrance, flavor and/or deodorizing/masking compositions comprising said new classes of odorous substituted hexahydro-5H-chromen-5-one or substituted tetrahydrobenzofuran-4(2H)-one derivatives thereof. The present invention furthermore refers to the said odorants which can be used in the novel fragrance, flavor and/or deodorizing/masking compositions of the present invention. The present invention also refers to a method for the production of the said odorants/compounds and of the corresponding fragrance, flavor and/or deodorizing/masking compositions containing said odorants/compounds.

More particularly, the present invention relates to 4,4-dimethyl-2,3,4,6,7,8-hexahydro-5H-chromen-5-one derivatives (formula A) and/or 3,3-dimethyl-3,5,6,7-tetrahydrobenzofuran-4(2H)-one derivatives (formula B) (odorants) which are useful as fragrance or flavor materials, in particular, in providing damascone-type, fruity, minty, woody, powdery, ambery and/or tobacco-like notes to perfume, aroma and/or deodorizing/masking compositions.

BACKGROUND OF THE INVENTION

Increasing limitations on the supply of natural fragrance ingredients have revolutionized the field of synthetic fragrance ingredients. Nowadays, there is an increasing demand for novel odorants/compounds and/or novel fragrance, flavor and/or deodorizing/masking compositions comprising said odorants/compounds.

Various isomeric damascones are used when fruity and floral notes are required. Typical damascones used include alpha-damascone, beta-damascone and delta-damascone. In addition to the above ingredients, beta-damascenone is also used for its fruity profile. However, all above ingredients are found to be skin sensitizers and therefore IFRA guidelines recommend considerable restrictions on their use in consumer products. Therefore, there has been a constant demand for safe alternatives to damascones.

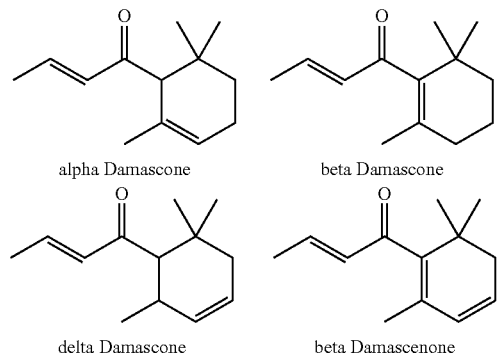

Damascone-type notes include alpha damascone-type notes (known as fruity, green, seedy, tropical, spicy, apple, woody), beta damascone type notes (known as fruity, floral, currant, black currant, plum, rose, honey, tobacco) and delta damascone-type notes (known as fruity, sweet, rose, natural, petal, currant, bud black currant, bud tobacco). Damascenone-type notes include beta-damascenone-type notes (known as natural sweet, fruity, rose, plum, grape, raspberry, sugar).

An examination of structures of various damascone isomers reveals presence of an alpha-beta unsaturated ketone motif. It is known that alpha-beta unsaturated carbonyl compounds are good Michael acceptors and hence many electrophilic alpha-beta unsaturated carbonyl compounds act as skin sensitizers by reacting with nucleophilic proteins on skin. (Aptula, A. O. et al., *Chem. Res. Toxicol.* 18 (2005) 1420-1426). It is also reported that electron donating substituents such as alkyl groups on alpha C-atom and to a lesser extent on beta C-atom, deactivate the $C^\beta=C^\alpha$ bond towards nucleophilic attack.

The article from Helvetica Acta—Vol. 69 (1986)—Pages 1681-4—entitled "*Synthesis of 2,3,4,6,7,8-Hexahydro-5H-1-benzopyran-5-ones and 3-(6-Oxo-1-cyclohexenyl)alkanoic Acids by Reduction of 4,6,7,8-tetrahydro-2H-1-benzopyran-2,5(3H)-diones*" provides corresponding comparative results of said reduction.

The article from Chemische Berichte, Vol. 123 (1990) pages 101-105, relates to the "*Light-Induced Conversion of 4,6,7,8-tetrahydro-2H-benzopyran-2,5(3H)-diones into 3,5,6,7-Tetrahydrobenzofuran-4(2H)-ones in Methanol*".

U.S. Pat. No. 4,268,445 (A) relates to the preparation of bicyclic enol-ethers (X) (where n is from 3 to 12, and $R_1$, $R_2$ and $R_3$ may be H or $C_1$-$C_4$-alkyl) by a 2-step sequence involving free radical adduct formation reaction of an allyl ether of general formula (V) (where $R_4$ is tert.-butyl, tetrahydrofuran-2-yl or tetrahydropyran-2-yl) with a cyclic ketone (W) to afford a compound of general formula (Y) followed by acid-catalyzed cyclization; said compounds (X) and (Y) being intermediates for the synthesis of musk-like fragrances.

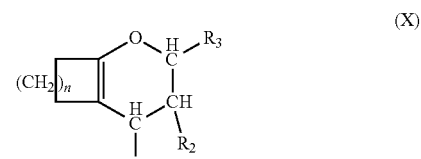

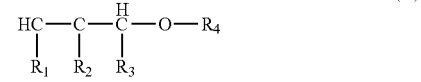

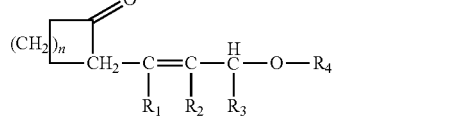

U.S. Pat. No. 4,233,226 (A) relates to 4a,5,6,7,8,8a-Hexahydro-4,7-dimethyl-4H-1-benzopyran (formula given below) which is useful as a odoriferous perfume compound, and a method for preparing the same.

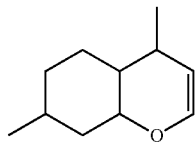

EP2848611 (A1) relates to compounds of the formula (Z) with R=—H, -methyl, ethyl, O-methyl or O-ethyl, R₁=—H, -methyl, ethyl, O-methyl or O-ethyl and n=1 or 2, their use as fragrances, preferred mixtures, consumer goods containing these compounds and their production.

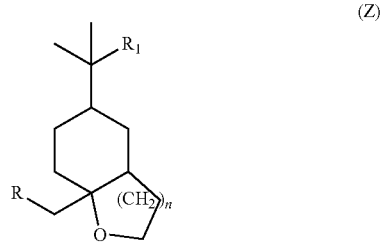

(Z)

WO2014064716 (A1) claims substituted hexahydro-(5H)-1-benzopyran-5-one (or hexahydro-(5H)-chromen-5-one) derivatives and substituted tetrahydro-(5H)-1-benzopyran-5-one (or tetrahydro-(5H)-chromen-5-one) derivatives, methods for synthesizing said compounds and perfumery compositions comprising an olfactory acceptable amount of the said compounds.

It was surprisingly found that certain compounds represented by formula A viz 4,4-dimethyl-2,3,4,6,7,8-hexahydro-5H-chromen-5-one derivatives and formula B viz 3,3-dimethyl-3,5,6,7-tetrahydrobenzofuran-4(2H)-one derivatives impart exotic fruity, damascone-like or damascenone-type profile. These compounds do not have any alpha-beta unsaturated ketone group in their structures. These compounds still have the geminal dimethyl group which is a common feature in all damascone isomers. Additionally, in these compounds, the ketone group is present as part of a six membered ring which is fused to a six membered ring (formula A) or a five-membered ring (formula B) containing geminal dimethyl group. The six membered ring (formula A) or five membered ring (formula B) containing the geminal dimethyl group also contains an oxygen atom. Interestingly, many of these compounds of formula A and B also advantageously impart minty, woody, powdery, ambery and/or tobacco-like notes to perfume, aroma and/or deodorizing/masking compositions.

Invention

This invention discloses novel fragrance, flavor and/or deodorizing/masking compositions comprising compounds of formula (I) with n being 0 or 1

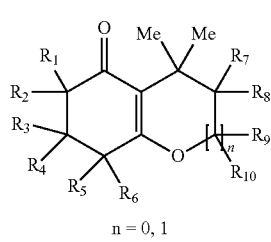

(I)

n = 0, 1 wherein $R_1$, $R_2$, $R_3$, $R_4$, $R_5$, $R_6$, $R_7$, $R_8$, $R_9$, $R_{10}$ are independently selected from a group consisting of hydrogen, C1 to C5 alkyl (for example methyl, ethyl, isopropyl, n-propyl, n-butyl, t-butyl, isobutyl, n-pentyl, cyclopropylmethyl, cyclobutylmethyl, cyclobutyl or cyclopentyl) or C1 to C5 alkenyl (for example an allyl group, 3-methylbut-2-en-1-yl, 3-methylbut-3-en-1-yl, but-3-en-1-yl or 2-methylallyl), with the proviso that when n=1 and $R_3$=$R_4$=$CH_3$, the other radicals $R_1$, $R_2$ and $R_5$ to $R_{10}$ can't all be hydrogen; and when n=0 and $R_3$=$R_4$=$CH_3$, the other radicals $R_1$, $R_2$ and $R_5$ to $R_8$ can't all be hydrogen; and when $R_7$=$R_8$=$CH_3$, the other radicals $R_1$, $R_2$ and $R_5$ to $R_6$ can't all be hydrogen; and when n=0 and $R_8$=$CH_3$, the other radicals $R_1$, $R_2$ and $R_5$ to $R_7$ can't all be hydrogen.

For the avoidance of doubt, following pairs of radicals viz, $R_1$ and $R_2$, $R_3$ and $R_4$, $R_5$ and $R_6$, $R_7$ and $R_8$, $R_9$ and $R_{10}$ are separated radicals, i.e. they do not form together a ring. The exclusion of the four above compounds is justified by the findings that they did not impart the olfactive properties according to the objectives of the present invention.

In an embodiment, the present invention relates to novel fragrance, flavor and/or deodorizing/masking compositions comprising compounds of formula (I) with n being 0 or 1

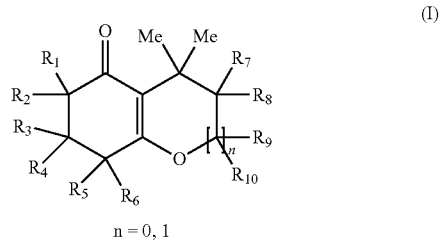

(I)

n = 0, 1 wherein $R_1$, $R_2$, $R_3$, $R_4$, $R_5$, $R_6$, $R_7$, $R_8$, $R_9$, $R_{10}$ are independently selected from a group consisting of hydrogen, methyl, ethyl, isopropyl, n-propyl, n-butyl or t-butyl groups, with the proviso that when n=1 and $R_3$=$R_4$=$CH_3$, the other radicals $R_1$, $R_2$ and $R_5$ to $R_{10}$ can't all be hydrogen; and when n=0 and $R_3$=$R_4$=$CH_3$, the other radicals $R_1$, $R_2$ and $R_5$ to $R_8$ can't all be hydrogen; and when $R_7$=$R_8$=$CH_3$, the other radicals $R_1$, $R_2$ and $R_5$ to $R_6$ can't all be hydrogen; and when n=0 and $R_8$=$CH_3$, the other radicals $R_1$, $R_2$ and $R_5$ to $R_7$ can't all be hydrogen.

General formula (I) has been used to denote compounds represented by formula A viz 4,4-dimethyl-2,3,4,6,7,8-hexahydro-5H-chromen-5-one derivatives and/or formula B viz 3,3-dimethyl-3,5,6,7-tetrahydrobenzofuran-4(2H)-one derivatives, wherein $R_1$, $R_2$, $R_3$, $R_4$, $R_5$, $R_6$, $R_7$, $R_8$, $R_9$, $R_{10}$ are independently selected from a group as defined hereinabove.

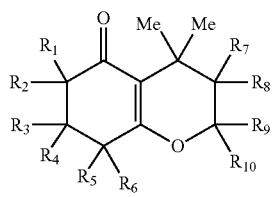

A

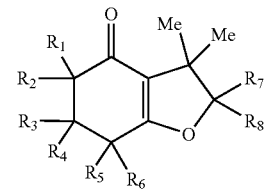

B

Compounds of formula B do not contain $R_9$ and $R_{10}$ groups since n=0 in general formula (I).

In an embodiment, the present invention relates to compounds of formula A or of formula B

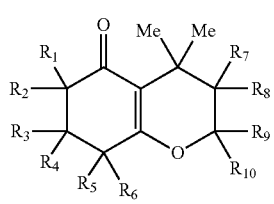

A

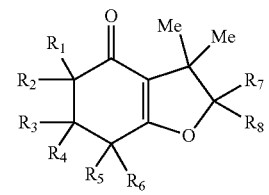

B wherein $R_1$, $R_2$, $R_3$, $R_4$, $R_5$, $R_6$, $R_7$, $R_8$, $R_9$, $R_{10}$ are independently selected from a group consisting of hydrogen, C1 to C5 alkyl (for example methyl, ethyl, isopropyl, n-propyl, n-butyl, t-butyl, isobutyl, n-pentyl, cyclopropylmethyl, cyclobutylmethyl, cyclobutyl or cyclopentyl) or C1 to C5 alkenyl (for example an allyl group, 3-methylbut-2-en-1-yl, 3-methylbut-3-en-1-yl, but-3-en-1-yl or 2-methylallyl), with the proviso that compounds of formula A don't include compound of formula A-exc, and

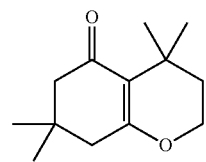

A-exc compounds of formula B don't include compounds of formulae B-exc1, B-exc2 and B-exc3

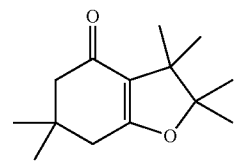

B-exc1

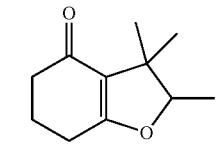

B-exc2

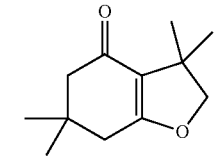

B-exc3

In an embodiment, the present invention relates to compounds of formula A or of formula B

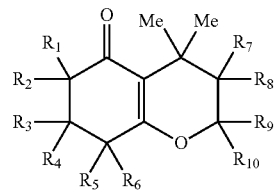

A

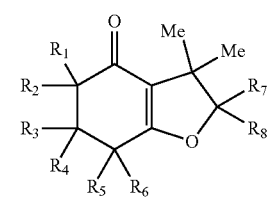

B wherein $R_1$, $R_2$, $R_3$, $R_4$, $R_5$, $R_6$, $R_7$, $R_8$, $R_9$, $R_{10}$ are independently selected from a group consisting of hydrogen, methyl, ethyl, isopropyl, n-propyl, n-butyl or t-butyl groups, with the proviso that compounds of formula A don't include compound of formula A-exc, and

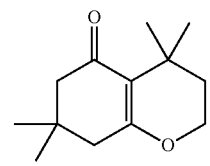

A-exc compounds of formula B don't include compounds of formulae B-exc1, B-exc2 and B-exc3

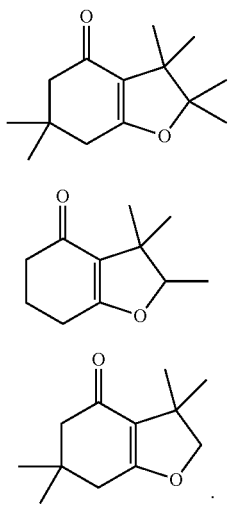

B-exc1

B-exc2

B-exc3

In another embodiment, the present invention relates to fragrance, flavor and/or deodorizing/masking compositions comprising compounds of formula A or of formula B

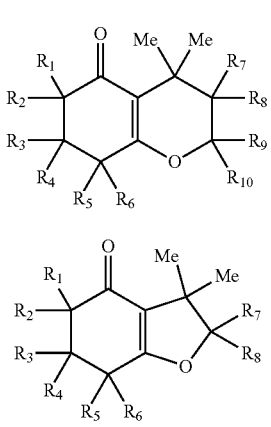

A

B wherein $R_1$, $R_2$, $R_3$, $R_4$, $R_5$, $R_6$, $R_7$, $R_8$, $R_9$, $R_{10}$ are independently selected from a group consisting of hydrogen, C1 to C5 alkyl (for example methyl, ethyl, isopropyl, n-propyl, n-butyl, t-butyl, isobutyl, n-pentyl, cyclopropylmethyl, cyclobutylmethyl, cyclobutyl or cyclopentyl) or C1 to C5 alkenyl (for example an allyl group, 3-methylbut-2-en-1-yl, 3-methylbut-3-en-1-yl, but-3-en-1-yl or 2-methylallyl), with the proviso that compound of formula A-exc is excluded, and

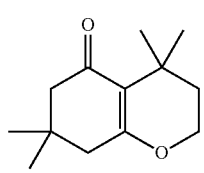

A-exc compounds of formulae B-exc1, B-exc2 and B-exc3 are excluded

In another embodiment, the present invention relates to fragrance, flavor and/or deodorizing/masking compositions comprising compounds of formula A or of formula B B-exc1

B-exc2

B-exc3

A

B wherein $R_1$, $R_2$, $R_3$, $R_4$, $R_5$, $R_6$, $R_7$, $R_8$, $R_9$, $R_{10}$ are independently selected from a group consisting of hydrogen, methyl, ethyl, isopropyl, n-propyl, n-butyl or t-butyl groups, with the proviso that compound of formula A-exc is excluded, and

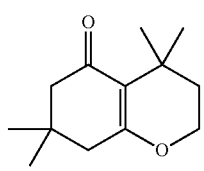

A-exc compounds of formulae B-exc1, B-exc2 and B-exc3 are excluded

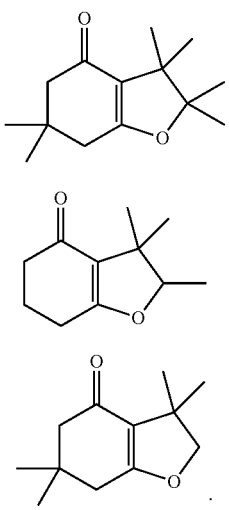

B-exc1

B-exc2

B-exc3

In another embodiment of this invention, compounds of general formula (I) may contain one or more chiral centres and can be chiral, e.g. they can be used as stereoisomeric (enantiomeric or diastereomeric) mixtures. In another embodiment, compounds of the formula (I) can also be advantageously used in pure enantiomeric or diastereomeric form.

DETAILED DESCRIPTION

The term "odorant" characterizing the compounds according to the present invention means that in humans it triggers an odor sensation which is preferably pleasant; it is therefore conventionally used for perfuming industrial and sanitary articles, washing agents, cleaning agents, personal hygiene products, cosmetics and the like. For the purposes of the present invention and appended claims, the term "odorant" includes "aroma substances". Aroma substances is the term usually used to designate substances which provide odor and/or flavor to foodstuffs.

The compounds of formula A or B may be used alone, as mixtures thereof, or in combination with a base material.

As used herein, the "base material" includes all known fragrance/flavor materials selected from the extensive range of natural products like: essential oils, extracts, resinoids or isolates and synthetic materials currently available, such as: hydrocarbons, alcohols, aldehydes and ketones, ethers and acetals, esters and lactones, nitriles, oximes or heterocycles, and/or in admixture with one or more ingredients or excipients/adjuvants conventionally used in conjunction with odorants in fragrance and/or flavor compositions, for example: solvents/diluents, stabilizers, carrier materials, and other auxiliary agents commonly used in the art.

The compounds of formula A or B may be used in a broad range of fragrance applications, e.g. in any field of fine and functional perfumery, such as perfumes, air care products, household products, laundry products, body care products and cosmetics. The compounds can be employed in widely varying amounts, depending upon the specific application and on the nature and quantity of other odorant ingredients.

According to a preferred embodiment of the invention, the fragrance, flavor and/or deodorizing/masking composition according to the present invention contains at least one compound according to formula A or B as previously described, in quantities between 0.00001 and 99.9 wt. %, for example between 0.0001 and 95 wt. %, for example between 0.001 and 25 wt. %, preferably between 0.01 and 15 wt. %, more advantageously between 0.1 and 10 wt. %, in particular between 1 and 5 wt. %, in each case relative to the entire composition.

According to a particularly preferred embodiment of the invention, in addition to the compound according to formula A or B according to the present invention, the fragrance, flavor and/or deodorizing/masking composition according to the present invention contains additional odorants, for example in a quantity of 0.1 to 99.9 wt. %, preferably 5-90 wt. %, in particular 15-70 wt. %, relative to the entire fragrance and/or flavor composition.

The compounds of formula A or B as described hereinabove may be employed in a consumer product base simply by directly mixing at least one compound of formula (A) and/or at least one compound of formula (B) or a fragrance composition comprising said compound or compounds of formula (A) and/or (B) with the consumer product base; or they may, in an earlier step, be entrapped with an entrapment material, for example, polymers, capsules, microcapsules and/or nanocapsules, liposomes, film formers, absorbents such as active carbon or zeolites, cyclic oligosaccharides, cyclic glycourils, and mixtures of two or more thereof, or they may be chemically bonded to substrates, which are adapted to release the fragrance molecule upon application of an external stimulus such as light; enzyme, air, water or the like; and then mixed with the consumer product base.

Thus, the invention can be useful for existing methods of manufacturing a fragrance, flavor and/or deodorizing/masking composition, comprising the incorporation of one or more compounds of formula (A) and/or (B), as a fragrance, flavor and/or deodorizing/masking ingredient, either by directly admixing the compound to the consumer product base or by admixing a fragrance, flavor and/or deodorizing/masking composition comprising said one or more compounds of formula (A) and/or (B), which may then be mixed with a consumer product base, using conventional techniques and methods. Through the addition of an olfactory-acceptable amount of at least one compound of formula (A) and/or (B), of the present invention as hereinabove described, the odor notes of a consumer product base can be improved, enhanced, and/or modified.

The present invention discloses novel fragrance, flavor and/or deodorizing/masking compositions comprising substituted 4,4-dimethyl-2,3,4,6,7,8-hexahydro-5H-chromen-5-one derivatives (formula A) and/or 3,3-dimethyl-3,5,6,7-tetrahydrobenzofuran-4(2H)-one derivatives (formula B). as defined hereinabove.

In a particular embodiment according to the present invention, the compounds of formulae (A) and/or (B) as defined hereinabove are claimed; said compounds being useful in the perfume, aroma and/or deodorizing/masking compositions of the present invention.

In an embodiment, a compound of formula (A) useful in a fragrance, flavor and/or decolorizing/masking composition is selected from the following compounds:
1) 4,4-dimethyl-2,3,4,6,7,8-hexahydro-5H-chromen-5-one
2) 4,4,6-trimethyl-2,3,4,6,7,8-hexahydro-5H-chromen-5-one
3) 6-ethyl-4,4-dimethyl-2,3,4,6,7,8-hexahydro-5H-chromen-5-one
4) 3,3,4,4-tetramethyl-2,3,4,6,7,8-hexahydro-5H-chromen-5-one
5) 2,3,3,4,4-pentamethyl-2,3,4,6,7,8-hexahydro-5H-chromen-5-one 6) 2,4,4-trimethyl-2,3,4,6,7,8-hexahydro-5H-chromen-5-one
7) 3,3,4,4,6-pentamethyl-2,3,4,6,7,8-hexahydro-5H-chromen-5-one
8) 3,4,4-trimethyl-2,3,4,6,7,8-hexahydro-5H-chromen-5-one
9) 4,4,6,8-tetramethyl-2,3,4,6,7,8-hexahydro-5H-chromen-5-one
10) 4,4,6,7,7-pentamethyl-2,3,4,6,7,8-hexahydro-5H-chromen-5-one
11) 6-(cyclopropylmethyl)-4,4-dimethyl-2,3,4,6,7,8-hexahydro-5H-chromen-5-one
12) 6-isobutyl-4,4-dimethyl-2,3,4,6,7,8-hexahydro-5H-chromen-5-one In an embodiment, a compound of formula (B) useful in a fragrance, flavor and/or decolorizing/masking composition is selected from the following compounds:
13) 3,3-dimethyl-3,5,6,7-tetrahydrobenzofuran-4(2H)-one
14) 3,3,5-trimethyl-3,5,6,7-tetrahydrobenzofuran-4(2H)-one
15) 3,3,7-trimethyl-3,5,6,7-tetrahydrobenzofuran-4(2H)-one
16) 5-ethyl-3,3-dimethyl-3,5,6,7-tetrahydrobenzofuran-4(2H)-one
17) 2,2,3,3-tetramethyl-3,5,6,7-tetrahydrobenzofuran-4(2H)-one
18) 2,2,3,3,5-pentamethyl-3,5,6,7-tetrahydrobenzofuran-4(2H)-one
19) 2,2,3,3,7-pentamethyl-3,5,6,7-tetrahydrobenzofuran-4(2H)-one
20) 5-ethyl-2,2,3,3-tetramethyl-3,5,6,7-tetrahydrobenzofuran-4(2H)-one In an embodiment according to the present invention, the fragrance, flavor and/or deodorizing/masking composition comprises a compound of formula (A) or of formula (B) which is selected from any of the compounds and/or from a mixture of two or more of the said compounds given above.

The applicants have surprisingly discovered that from an olfactory perspective, the compounds of formula (A) have damascone-type or damascenone-type odor profile. In fact, many compounds of formula (A) display exotic fruity and minty notes. Many compounds of formula (A) and (B) also exhibit woody, powdery, ambery and/or tobacco-like notes. In fact, some compounds of formula (A) also display sandalwood profile. The compounds (A) and (B) are very retentive on a blotter; for more than 4 days. Indeed, compounds of formula (A) and (B) perform extremely well in woody, fougere and rose accords.

In an embodiment of the present invention, the claimed fragrance, flavor and/or deodorizing/masking composition is advantageously used as a perfumery composition. Perfumery compositions according to the present invention generally include a perfume, a cologne, an eau du toilette, and/or an eau de parfum. In an embodiment of the present invention, the claimed fragrance, flavor and/or deodorizing/masking composition is advantageously used in a cosmetic formulation, a personal care product, a cleansing product, a fabric softener, and/or air freshener, and the like. Furthermore, it is within the purview of embodiments of the invention that the novel fragrance, flavor and/or deodorizing/masking composition(s) and/or novel compound(s) of formula (A) or of formula (B) described herein may be integrated into building materials, wall and floor coverings, vehicle components, and the like.

In general, in addition to the novel odorant and/or fragrance, flavor and/or deodorizing/masking compositions described herein, suitable fragrance, flavor or deodorizing compositions may advantageously include conventional ingredients such as, for example, solvents, carriers, stabilizers, emulsifiers, moisturizers, dispersants, diluents, thickeners, thinners, other odorants, and/or adjuvants, and the like.

The compounds of formula (A) or of formula (B) combine with numerous known natural or synthetic fragrance, flavor and/or deodorizing/masking materials, whereby the range of the natural ingredients can embrace not only readily-volatile but also semi-volatile and slightly-volatile components and the range of the synthetic ingredients can embrace representatives from many classes of substances, such as described in Steffen Arctander, Perfume and Flavor Chemicals, vol. 1&2, Montclair, N.J., 1969; Steffen Arctander, Perfume and Flavor Materials of Natural Origin, Elizabeth, N.J., 1960 or Horst Surburg, Johannes Panten, Common Fragrance and Flavor Materials, Wiley-VCH, Weinheim, 2016 and as will be evident from the following nonlimitting compilation:

Natural products such as:

Ajowan oil, Amyris oil, Armoise oil, Artemisia oil, Basil oil, Bees wax absolute, Bergamot oil, Birch tar oil, Black pepper oil, Black pepper oleoresin, Camphor oil, Cananga oil, Caraway oil, Cardamom oil, Carrot seed oil, Castoreum absolute, Cedar leaf oil, Cedarwood oil, Celery seed oil, Chamomile oil, Cinnamon bark oil, Cinnamon leaf oil, Cistus absolute, Cistus oil, Citronella oil, Citronella terpenes, Clary sage oil, Clove oil rectified, Cognac oil white, Coriander seed oil, Cumin seed oil, Cypress oil, Davana oil, Dill seed oil, Elemi oil, Elemi resinoid, Eucalyptus oil, Fir needle oil, Galbanum oil, Geranium oil, Ginger oil Indian, Grapefruit oil, Guaiacwood oil, Gurjun balsam, Jasmin absolute, Jatamansi oil, Juniper berry oil, Juniper leaf oil, Kachur oil, Labdanum absolute, Labdanum resinoid, Lavender oil, Lemon oil, Lemon oil terpenes, Lemongrass oil, Lime oil, Litsea cubeba oil, Litsea cubeba terpenes, Lobhan choya resinoid, Mandarin oil, Mentha arvensis oil, Mentha citrata oil, Mimosa absolute, Myrrh resinoid, Nagarmotha oil, Nutmeg oil, Oakmoss absolute, Oakmoss resinoid, Olibanum oil, Olibanum resinoid, Orange oil, Origanum oil, Palma rosa oil, Patchouli oil, Peppermint oil, Peru Balsam resinoid, Petitgrain oil, Pine needle oil, Pink pepper oil, Rose absolut, Rose oil, Rosemary oil, Sandalwood oil, Seaweed absolute, Spearmint oil, Sugandh kokila oil, Sugandh mantri oil, Tagete oil, Tolu Balsam resinoid, Tuberose absolute, Turmeric oil, Turpentine oil, Valerian oil, Vetiver oil, Vetiver terpenes.

Synthetic raw materials for instance:

Esters such as: Aldehyde C16, Allyl amyl glycolate, Allyl caproate, Allyl cyclohexyl propionate, Allyl heptoate, Allyl phenoxy acetate, Amyl acetate iso, Amyl benzoate, Amyl butyrate, Amyl caproate, Amyl cinnamate, Amyl isovalerate, Amyl phenyl acetate, Amyl propionate, Amyl salicylate iso, Amyris acetate, Anisyl acetate, Benzyl acetate, Benzyl benzoate, Benzyl butyrate, Benzyl cinnamate, Benzyl formate, Benzyl isobutyrate, Benzyl isoeugenol, Benzyl propionate, Benzyl salicylate, Benzyl tiglate, Butyl acetate, Butyl butyrate, Butyl butyryl lactate, Caryophyllene acetate, Cedryl acetate, Cinnamyl acetate, Cinnamyl butyrate, Cis-3-hexenyl acetate, Cis-3-hexenyl benzoate, Cis-3-hexenyl caproate, Cis-3-hexenyl formate, Cis-3-hexenyl isobutyrate, Cis-3-hexenyl-2-methyl butyrate, Cis-3-hexenyl propionate, Cis-3-hexenyl salicylate, Cis-3-hexenyl tiglate, Citronellyl acetate, Citronellyl butyrate, Citronellyl formate, Citronellyl isobutyrate, Citronellyl propionate, Citronellyl tiglate, Cyclabute, Cyclogalbanate, Cyclohexyl ethyl acetate, Decyl acetate, Dibutyl phthalate, Diethyl malonate, Diethyl phthalate, Dihydromyrcenyl acetate, Dimethyl octanyl acetate, Dimethyl phenyl ethyl carbinyl acetate, Dioctyl adipate, Dioctyl phthalate, Dimethyl benzyl carbinyl acetate, Dimethyl benzyl carbinyl butyrate, Ethyl linalyl acetate, Ethyl 2-methyl butyrate, Ethyl 3-phenyl propionate, Ethyl acetate, Ethyl acetoacetate, Ethyl benzoate, Ethyl butyrate, Ethyl caprate, Ethyl caproate, Ethyl caprylate, Ethyl cinnamate, Ethyl heptoate, Ethyl hexyl acetate, Ethyl isobutyrate, Ethyl laurate, Ethyl pelargonate, Ethyl phenoxy acetate, Ethyl phenyl acetate, Ethyl phenyl glycidate, Ethyl propionate, Ethyl safranate, Ethyl salicylate, Ethyl valerate, Eugenyl acetate, Evernyl, Fenchyl acetate, Floramat, Frescolat ML, Fructone, Fruitate, Geranyl acetate, Geranyl butyrate, Geranyl formate, Geranyl propionate, Geranyl tiglate, Givescone, Guaiol acetate, Hedionate, Hedione, Helvetolide, Herbanate, Hexyl acetate, Hexyl benzoate, n-Hexyl butyrate, Hexyl caproate, Hexyl isobutyrate, Hexyl propionate, Hexyl salicylate, Isobornyl acetate, Isobutyl acetate, Isobutyl phenyl acetate, Isobutyl salicylate, Isoeugenyl acetate, Isononyl acetate, Isopentyrate, Isopropyl 2-methyl butyrate, Isopropyl myristate, Jasmonyl, Liffarome, Linalyl acetate, Mahagonate, Manzanate, Menthanyl acetate, Menthyl acetate, Methyl benzoate, 2-Methyl butyl acetate, Methyl camomille, Methyl cinnamate, Methyl cyclogeranate, Methyl heptine carbonate, Methyl laurate, Methyl octine carbonate, Methyl phenyl acetate, Methyl salicylate, Methyl-2-methyl butyrate, Neofolione, Nopyl acetate, Octenyl acetate, Octyl acetate, Octyl isobutyrate, Para cresyl acetate, Para cresyl isobutyrate, Para cresyl phenyl acetate, Pear ester, Peranat, Phenoxy ethyl isobutyrate, Phenyl ethyl acetate, Phenyl ethyl butyrate, Phenyl ethyl formate, Phenyl ethyl isobutyrate, Phenyl ethyl phenyl acetate, Phenyl ethyl propionate, Phenyl ethyl salicylate, Phenyl ethyl tiglate, Phenyl propyl isobutyrate, Prenyl acetate, Romandolide, Sagecete, Styrallyl acetate, Styrallyl propionate, Tangerinol, Terpinyl acetate, Thesaron, Trans-2-hexenyl acetate, Tropicate, Verdox, Verdyl acetate, Verdyl propionate, Vertenex, Vetikol acetate, Vetiveryl acetate, Yasmolys.

Lactones such as: Ambrettolide, Arova N, Celeriax, Decalactone delta, Decalactone gamma, Dodecalactone delta, Dodecalactone gamma, Ethylene brassylate, Exaltolide, Heptalactone gamma, Hexalactone delta, Hexalactone gamma, Methyl laitone, Methyl octalactone, Nonalactone delta, Nonalactone gamma, Octahydrocoumarine, Octalactone delta, Octalactone gamma, Rootylone, Silvanone supra, Undecalactone delta, Undecalactone gamma, Valerolactone gamma, 10-OxaHexaDecanolide (OHD musk), Coumarin, Habanolide, Jasmolactone.

Aldehydes such as: Acetaldehyde, Adoxal, Aldehyde C10, Aldehyde C11 iso, Aldehyde C11 moa, Aldehyde C11 undecylenic, Aldehyde C11 undecylic, Aldehyde C12 lauric, Aldehyde C12 MNA, Anisaldehyde, Amyl cinnamaldehyde, Benzaldehyde, Bourgeonal, Campholenaldehyde, Cantonal, Cetonal, Cinnamic aldehyde, Cis-4-decenal, Cis-6-nonenal, Citral, Citronellal, Citronellyl oxyacetaldehyde, Cocal, Cuminaldehyde, Curgix, Cyclal C, Cyclamen aldehyde, Cyclomyral, Cyclovertal, Decenal 9, Dupical, Empetal, Ethyl vanillin, Floralozone, Florhydral, Geraldehyde, Helional, Heliotropin, Heptanal, Hexanal, Hexyl cinnamaldehyde, Hivernal neo, Hydratropaldehyde, Hydroxycitronellal, Intreleven aldehyde, Isobutavan, Isocyclocitral, Isovaleraldehyde, Lilial, Limonenal, Maceal, Mefranal, Melonal, Methyl cinnamaldehyde, Nonadien-al trans-2 cis-6, Nonanal, Octanal, Oncidal, Para tolyl aldehyde, Phenyl acetaldehyde, Phenyl propyl aldehyde, Precyclemone B, Safranal, Salicylaldehyde, Scentenal, Syringa aldehyde, Trans-4-decenal, Trans-2-dodecenal, Trans-2-hexenal, Trans-2-nonenal, Trifernal, Vanillin, Veratraldehyde, Vernaldehyde.

Ketones such as: Acetanisol, Acetoin, Acetophenone, Aldron, Allyl ionone, Benzophenone, Benzyl acetone, Calone, Camphor, Carvone d-, Carvone l-, Cashmeran, Cedryl methyl ketone, Cepionate, Claritone, Cosmone, Crysolide, Cyclotene, Damascenone, Damascone alpha, Damascone beta, Damascone delta, Damascone gamma, Diacetyl, Dihydro beta ionone, Dihydro isojasmonate, Dimethyl octenone, Dynascone, Ethyl amyl ketone, Ethyl maltol, Fenchone, Filbertone, Geranyl acetone, Globanone, Heptyl cyclopentanone, Ionone alpha, Ionone beta, Ionone pure, Iriswood, Irone alpha, Iso E Super, Isofenchone, Isojasmone T, Isolone K, Isomenthone, Isophorone, Jasmone cis-, Kambernoir, Kephalis, Koavone, Lavendinal, Maltol, Menthone, Methyl acetophenone, Methyl amyl ketone, Methyl heptenone, Methyl hexyl ketone, Methyl ionone gamma, Methyl naphthyl ketone beta, Methyl nonyl ketone, Muscenone, Muscone, Nectaryl, Orinox, OTBC Ketone, Para tertbutylcyclohexanone, Patchwood, Phantolid, Pharaone, Piperitone, Plicatone, Raspberry ketone, Raspberry ketone methyl ether, Safraleine, Spirogalbanone pure, Tonalid, Trimofix O, Veloutone, Vetikon.

Alcohols such as: Alcohol oxo C13, Amber core, Ambermax, Ambrinol, Amyl vinyl carbinol, Anisic alcohol, Bacdanol, Benzyl alcohol, Butanol, Cedrol crystals, Cinnamic alcohol, Citronellol, Coranol, Decanol, Dimethyl benzyl carbinol, Dimethyl octanol, Dimethyl phenyl ethyl carbinol, Dimetol, Fenchol, Hexanol, Isoborneol, Isobornyl cyclohexanol, Javanol, Keflorol, Kohinool, Lauryl alcohol, Lilyflore, Linalool oxide, Mayol, Menthol, Norlimbanol, Octanol, Osyrol, Para tertbutylcyclohexanol, Phenoxanol, Phenoxyethanol, Phenyl ethyl alcohol, Phenyl propyl alcohol, Propylene glycol, Rosaphen, Rose glycol, Styrallyl alcohol, Tricyclodecane dimethanol, Tetrahydro linalool, Tetrahydro myrcenol, Timberol, Undecavertol, Cis-3-hexenol, Citronellol laevo, Cyclofloranol, Dihydrolinalool, Dihydromyrcenol, Dimyrcetol, Ebanol, Geraniol, Isopulegol, Linalool, Nerol, Nerolidol, Nonadien-ol trans-2 cis-6, Polysantol, Rosalva, Sandalmysore core, Sandalore, Terpinen-4-ol, Terpineol, Trans-2-hexenol.

Phenols such as: Butylated hydroxyanisole, Dihydroeugenol, Dimethyl hydroquinone, Dimethyl resorcinol, Eugenol pure, Guaiacol, Isoeugenol, Meta cresol, Methyl diantilis, Para cresol, Propenyl guaethol, Thymol, Ultravanil.

Ethers such as: Ambroxan, Anethole, Anther, Benzyl isoamyl ether, Benzyl isopropyl ether, Benzyl isovalerate, Boisiris, Cedramber, Cetalox, Decyl methyl ether, Dibenzyl ether, Dihydro rose oxide, Diphenyl oxide, Doremox, Estragole, Ethyl linalool, Eucalyptol, Galaxolide, Gyrane, Herbavert, Lime oxide, Madrox, Methyl isoeugenol, Naphthyl isobutyl ether beta, Nerol oxide, Nerolin bromelia, Para cresyl butyl ether, Para cresyl methyl ether, Petiole, Phenyl ethyl methyl ether, Rhubafuran, Rose oxide, Rosyrane, Trisamber, Vetylbois K, Yara yara.

Acetals such as: Acetal CD, Acetal R, Amberketal, Boisambrene forte, Citrathal, 1,1-Diethoxyethane, Emeraldine, Freshopal, Herboxane, Indoflor, Jacinthaflor, Magnolan, Spirambrene, Viridine, Elintaal, Glycolierral, Karanal, Methyl pamplemousse.

Hydrocarbons such as: Bisabolene, Camphene, Carene delta 3, Caryophyllene, Cedrene, Cymene para, Dipentene, Diphenyl methane, Isolongifolene, Limonene d-, Longifolene, Myrcene, Naphthalene, Ocimene, Pinene alpha, Pinene beta, Styrene, Terpinene gamma, Terpinolene, 1,3,5-Undecatriene, Verdoracine.

Sulphur compounds such as: Corps cassis, Dibutyl sulphide, Dimethyl sulphide, Exovert, Grapefruit thiol, Oxane, Ribes mercaptan, Sulfurol, Thiocineol.

Nitriles such as: Cinnamyl nitrile, Citronellyl nitrile, Citronitrile, Clonal, Cumin nitrile, Hexyl cyclopentanone, Irisnitrile, Lemonile, Peonile, Tridecyl nitrile, Agrumen nitrile, n-decyl nitrile.

Oximes such as: Buccoxime, Labienoxime, Stemone.

Nitrogen heterocycles such as: 2-acetylpyrazine, 2-acetylpyridine, sec-butylquinoline, Corps racine, 2-ethyl-3,5(or 6)-dimethylpyrazine, Furfuryl pyrrole, Indole, Isobutyl quinoline, 2-Isobutyl-3(or 6)-methoxypyrazine, Isopropyl quinoline, Maritima, p-methyl quinoline, Skatol, 2,3,5-trimethylpyrazine.

Nitro compound such as: Musk Ketone.

Schiff bases such as: Aurantiol, Helianthral, Ligantraal, Verdantiol.

Other materials such as: Acetanilide, Gardamide, Paradisamide, Dimethyl anthranilate, Methyl anthranilate, n-Butyric acid, Capric acid, Caproic acid, Caprylic acid, Phenylacetic acid, Caryophyllene oxide, Cedroxyde, Tobacarol.

The compounds of formula (A) or of formula (B) can accordingly be used for the production of compositions and, as will be evident from the foregoing compilation, a wide range of known odorants/fragrance, flavor and/or deodorizing/masking materials. In the production of such compositions, the known fragrance, flavor and/or deodorizing/masking materials referred to earlier can be used according to methods which are known to the perfumer such as, for example, according to W. A. Poucher, Perfumes, Cosmetics and Soaps 2, 7th Edition, Chapman and Hall, London 1974.

In an embodiment of the present invention, the claimed fragrance, flavor and/or deodorizing/masking composition comprises in addition to the compound(s) of formula (A) or of formula (B), at least one ester and/or one alcohol, preferably at least a mixture of ester and alcohol; the said ester and/or alcohol are preferably selected from the list defined herein above. In an embodiment of the present invention, the claimed odorant composition is characterised by a total content of the compound(s) of formula (A) or of formula (B) together with the ester(s) and/or alcohol(s) which is superior to 25 wt %, preferably superior to 50 wt %, for example superior to 75 wt %, or even superior to 90 wt %.

Preparation

As reported in Hombrecher, H. et al. in Helvetica Chimica Acta volume 69, year 1961, pages 1681-1684, compound of formula (A), for example, 4,4,7,7-tetramethyl-2,3,4,6,7,8-hexahydro-5H-chromen-5-one was synthesized by LiAlH$_4$-mediated or NaBH$_4$-mediated reduction of 4,4,7,7-tetramethyl-4,6,7,8-tetrahydro-2H-chromene-2,5 (3H)-dione, which in turn was synthesized by dimedone and either alkylidene-substituted Meldrum's acid or substituted acryloyl chlorides.

We envisaged a different approach wherein we synthesized compounds of formula (A) or (B) either in one step (Method P) or in two steps (methods Q or R). However, we needed a method that will selectively furnish 6-substituted-4,4,-dimethyl-2,3,4,6,7,8-hexahydro-5H-chromen-5-one derivatives. Since method Q did not furnish the desired 6-substituted derivative selectively, in that it also gave an inseparable 8-substituted derivative; we also invented a new synthetic approach (Method S) that gave only 6-substituted-4,4,-dimethyl-2,3,4,6,7,8-hexahydro-5H-chromen-5-one derivatives.

Method P. In a preferred embodiment according to the present invention, the compounds represented by the general formula (A) and/or (B) can be advantageously synthesized in one step from corresponding cyclohexanediones formula (I) and an alcohol of formula (II) in the presence of an acid, for example in presence of p-toluenesulfonic acid acid (0.05 equivalents), using toluene as solvent, at a temperature of 80-90° C.

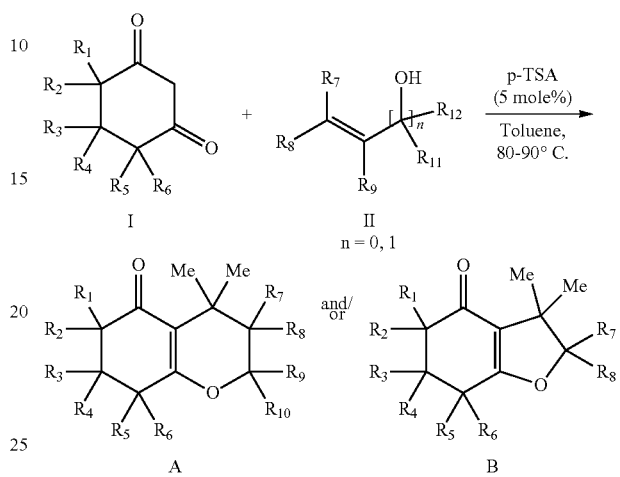

Method Q. In another preferred embodiment according to the present invention, the compounds of formula (A) can be advantageously prepared in two steps from cyclohexanediones (I) and a homoallylic alcohol of formula (III). The first step in this scheme is the reaction of cyclohexanedione (1) with alcohol (III) in presence of iodine/toluene/THF to afford vinylogous ester (IV). In the second step, compound (IV) is subjected to AlCl$_3$-mediated cyclization in ethylene dichloride (EDC) to afford product (A) and/or (B).

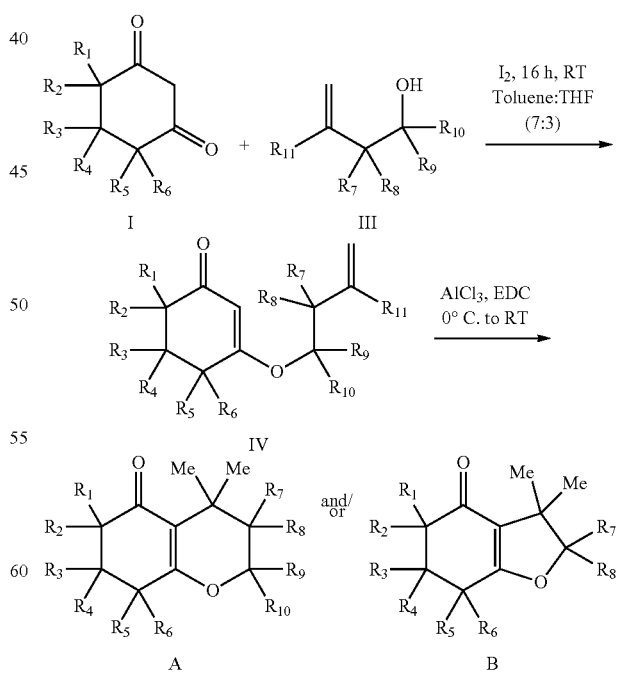

Method R. In another preferred embodiment according to the present invention, the compounds of formula (A) and/or (B) can be advantageously prepared in two steps from cyclohexanediones (I) and an allylic alcohol of formula (II). The first step in this scheme is the reaction of cyclohexanedione (I) with alcohol (II) in presence of iodine/toluene/THF to afford vinylogous ester (V). In the second step, compound (V) is subjected to AlCl$_3$-mediated cyclization in ethylene dichloride (EDC) to afford products (A) and/or (B).

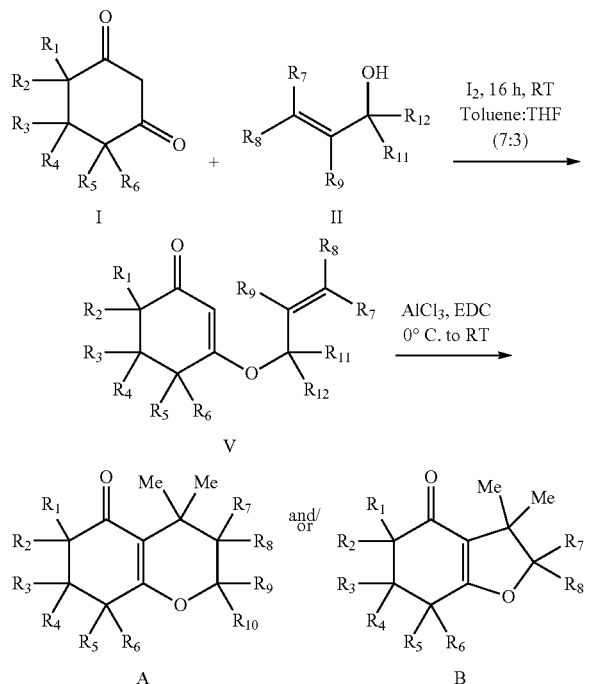

In another preferred embodiment according to the present invention, if 4-alkylcyclohexan-1,3-diones (XI) and isoprenol were treated with iodine/toluene/THF as per method Q, then two isomers (XII) and (XIII) were obtained. This isomeric mixture was subjected to AlCl$_3$-mediated cyclization to afford products (A$_1$) and (A$_2$). The two isomers can be separated by column chromatography but often are not separable by fractional distillation as they have very close boiling points.

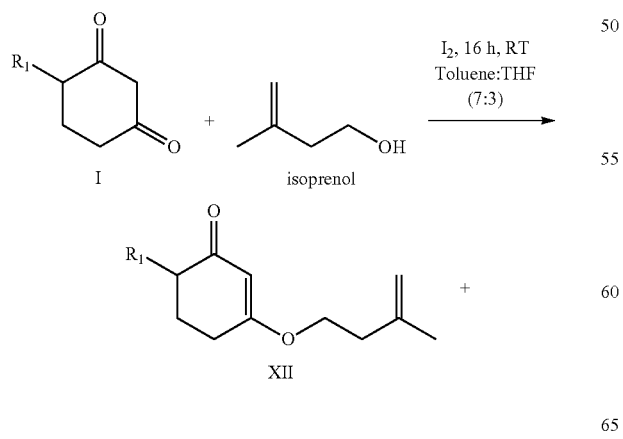

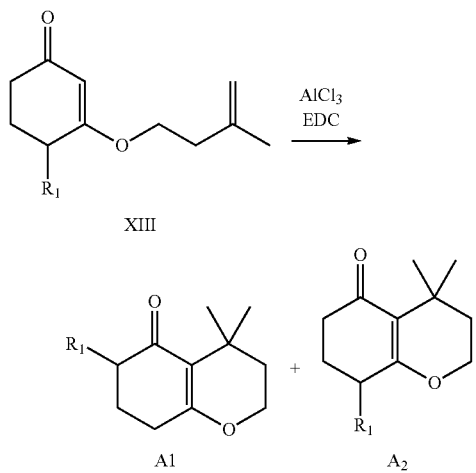

Hence, a method that will selectively afford A$_1$ was also desirable.

Method S. Ethyl acetotacetate was alkylated using base and alkyl iodidie (R$_1$-I). The resulting alkyl derivative (XIV) on treatment with methyl acrylate in presence of potassium tertiary butoxide in THF at 0° C. yielded 4,4,-ethoxycarbonyl-alkyl-substituted cyclohexan-1,3-dione (XV), Surprisingly, we found that compound (XV) reacted with isoprenol in presence of iodine/Toluene/THF to afford only one regioisomer (XVI). LiCl-mediated decarboxylation in DMSO at 170° C. afforded vinylogous ester (XII) selectively and subsequent AlCl$_3$-mediated cyclization of (XII) afforded only A$_1$.

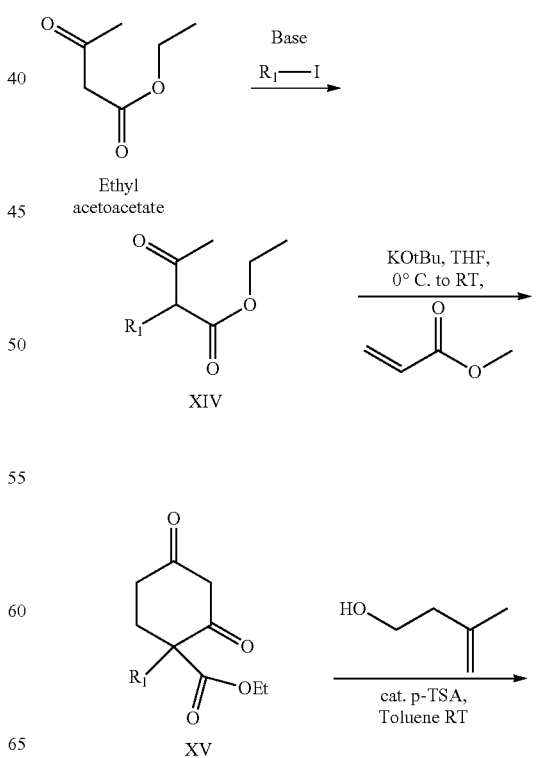

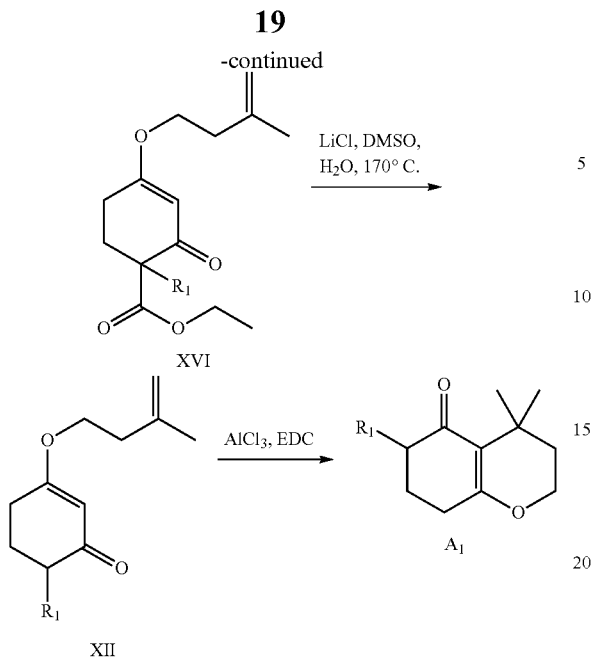

EXAMPLES

Example 1

4,4-dimethyl-2,3,4,6,7,8-hexahydro-5H-chromen-5-one

Synthesis of 4,4-dimethyl-2,3,4,6,7,8-hexahydro-5H-chromen-5-one

Step 1: Synthesis of 3-((3-methylbut-3-en-1-yl)oxy)cyclohex-2-en-1-one

Method Q:

To a mixture of cyclohexane-1,3-dione (25 g, 223 mmol, 1 equiv) in toluene (250 ml) were added 3-methylbut-3-en-1-ol (23.04 g, 268 mmol, 1.2 equiv) and iodine (2.72 g, 10.71 mmol, 0.048 eqiv). After stirring the reaction mixture for 16 h, the reaction was quenched with 200 mL of 10% sodium thiosulfate solution. Then toluene layer was separated and the aqueous layer was extracted with ethylacetate (2×50 mL). The combined organic layer was washed with water (1×50 mL) and dried over anhydrous sodium sulfate. The organic solvent was evaporated on a rotary evaporator to afford 30 gm of crude mass which on flash chromatography afforded 32 g of 3-((3-methylbut-3-en-1-yl)oxy)cyclohex-2-en-1-one (80%).

$^1$H-NMR (400 MHz, CDCl$_3$): δ 5.39 (s, 1H), 4.85 (s, 1H), 4.76 (s, 1H), 3.96 (t, J=6.8 Hz, 2H), 2.47-2.35 (m, 6H), 2.02-1.96 (m, 2H), 1.78 (s, 3H)

Step 2: Synthesis of 4,4-dimethyl-2,3,4,6,7,8-hexahydro-5H-chromen-5-one

Method Q: To a stirred solution of AlCl$_3$ (266 g, 2 mol, 1.2 equiv) in 1,2-dichloroethane (200 mL) was added a solution of 3-((3-methylbut-3-en-1-yl)oxy)cyclohex-2-en-1-one (300 g, 1.66 mol, 1 equiv) in EDC (100 mL) dropwise at 15° C. The reaction mixture was warmed to 25° C. and stirred for 6 h. The reaction was mixture was slowly poured into ice water under vigorous stirring. The aqueous layer was separated and extracted with DCM (500 mL). The combined organic layer was washed with water (2×1 L) and then stirred with aqueous sodium bicarbonate solution (1 L) for one hour. This was repeated twice. The organic layer was separated and dried over sodium sulfate and concentrated on a rotary evaporator to afford 220 g of crude product. The crude was purified by fractional distillation (81-83° C./1 mm) to afford 189 g of pure 4,4-dimethyl-2,3,4,6,7,8-hexahydro-5H-chromen-5-one (63%).

$^1$H-NMR (400 MHz, CDCl$_3$): δ 4.10-4.07 (m, 2H), 2.37-2.29 (m, 4H), 1.90-1.84 (m, 2H), 1.69-1.66 (m, 2H), 1.29 (s, 6H). $^{13}$C-NMR (100 MHz, CDCl$_3$): δ 197.4, 170.9, 119.3, 63.9, 39.6, 38.1, 29.1, 27.3, 20.1.

Odor profile: tobacco, leathery, fruity, woody

Example 2

4,4,6-trimethyl-2,3,4,6,7,8-hexahydro-5H-chromen-5-one

Synthesis 4,4,6-trimethyl-2,3,4,6,7,8-hexahydro-5H-chromen-5-one

Method S:

Step 1

Synthesis of ethyl 1-methyl-2,4-dioxocyclohexane-1-carboxylate

To a solution of ethyl 2-methyl-3-oxobutanoate (49.3 ml, 348 mmol, 1.2 equiv) in tetrahydrofuran (400 ml) was added potassium tert-butoxide (35.8 g, 319 mmol, 1.1 equiv) at room temperature. The reaction mixture was cooled to 0° C. followed by addition of methyl acrylate (26.3 ml, 290 mmol, 1 equiv). After stirring the reaction mixture for 16 h, 2M HCl was added to adjust the pH to 3-4 and the mixture was extracted with EtOAc (3×50 mL). The organic layer was washed with water, brine and then concentrated to give crude material which was purified by column chromatography using 30-35% EtOAc in hexanes to give ethyl 1-methyl-2,4-dioxocyclohexane-1-carboxylate (47 g, 82%).

Step 2

Synthesis of ethyl 1-methyl-4-((3-methylbut-3-en-1-yl)oxy)-2-oxocyclohex-3-ene-1-carboxylate To a solution of ethyl 1-methyl-2,4-dioxocyclohexane-1-carboxylate (100 g, 504 mmol) in toluene (1600 mL) at 25° C. were added 3-methylbut-3-en-1-ol (61.1 ml, 605 mmol) and 4-methylbenzenesulfonic acid (17.37 g, 101 mmol). After stirring the reaction mixture 25° C. for 16 h, it was quenched with saturated solution of NaHCO$_3$. The mixture was extracted with EtOAc (3×100 mL) and the combined organic layer was washed with brine, dried with anhydrous Na$_2$SO$_4$ and filtered. The organic layer concentrated to afford crude ethyl 1-methyl-4-((3-methylbut-3-en-1-yl)oxy)-2-oxocyclohex-3-ene-1-carboxylate (89 g) which was used as such in the next reaction.

Step 3

Synthesis of 6-methyl-3-((3-methylbut-3-en-1-yl)oxy)cyclohex-2-en-1-one

To a stirred solution of crude ethyl 1-methyl-4-((3-methylbut-3-en-1-yl)oxy)-2-oxocyclohex-3-ene-1-carboxylate (89 g, 334 mmol) in DMSO (355 ml) and water (14 mL) was added lithium chloride (70.8 g, 1671 mmol). The reaction mixture was stirred at 170° C. for 8 h. The reaction mixture was diluted with water and then extracted with EtOAc (3×50 mL). The combined organic layer was washed with brine, filtered and concentrated to get crude residue that was purified with column chromatography to afford 6-methyl-3-((3-methylbut-3-en-1-yl)oxy)cyclohex-2-en-1-one (30 g, 46%).

Step 4

Synthesis of 4,4,6-trimethyl-2,3,4,6,7,8-hexahydro-5H-chromen-5-one

To a stirred solution of 6-methyl-3-((3-methylbut-3-en-1-yl)oxy)cyclohex-2-en-1-one (30 g, 154 mmol) in 1,2-dichloroethane (250 ml) was added aluminum trichloride (41.2 g, 309 mmol) at 25° C. The reaction was stirred at 25° C. for 20 min. The reaction mixture was added to ice-water slowly and the mixture was stirred for 30 min, followed by its extraction with methylene dichloride (3×50 mL). The combined organic layer was washed with brine, dried over anhydrous $Na_2SO_4$ and filtered. The organic layer was concentrated and the resulting crude compound was purified by column chromatography using 5% EtOAc in hexane to give 4,4,6-trimethyl-2,3,4,6,7,8-hexahydro-5H-chromen-5-one (18 g, 60%).

$^1$H-NMR (400 MHz, $CDCl_3$): δ 4.06-4.02 (m, 1H), 3.98-3.92 (m, 1H), 2.37-2.23 (m, 2H), 2.18-2.14 (m, 1H), 1.91-1.84 (m, 1H), 1.66-1.47 (overlapping m, 3H), 1.22 (s, 3H), 1.18 (s, 3H), 1.04 (d, J=6.8 Hz, 3H). $^{13}$C-NMR (100 MHz, $CDCl_3$): δ 200.1, 169.9, 118.7, 64.0, 41.1, 39.8, 29.4, 28.3, 28.2, 28.1, 27.0, 15.8

Odor profile: exotic fruity, delta-damascone type, woody

Example 3

6-ethyl-4,4-dimethyl-2,3,4,6,7,8-hexahydro-5H-chromen-5-one

Synthesized from ethyl 2-ethyl-3-oxobutanoate in 4 steps as per method S.

$^1$H-NMR (400 MHz, $CDCl_3$): δ 4.04-3.93 (m, 2H), 2.34-2.21 (m, 2H), 1.98-1.85 (s, 2H), 1.81-1.71 (m, 1H), 1.66-1.49 (overlapping m, 3H), 1.39-1.28 (m, 1H), 1.20 (s, 3H), 1.19 (s, 3H), 0.84 (t, J=7.2 Hz, 3H).

Odor profile: fruity, plum, woody, beta-damascone like

Example 4

2,3,3,4,4-pentamethyl-2,3,4,6,7,8-hexahydro-5H-chromen-5-one

Synthesized in 2 Steps from cyclohexane-1,3-dione and 3,3,4-trimethylpent-4-en-2-ol as per method Q.

$^1$H-NMR (400 MHz, $CDCl_3$): δ 3.98 (q, J=6.4 Hz, 1H), 2.33-2.24 (overlapping m, 3H), 2.21-2.15 (m, 1H), 1.84-1.70 (m, 2H), 1.17 (d, J=6.8 Hz, 3H), 1.15 (s, 3H), 1.09 (s, 3H), 0.71 (s, 3H), 0.67 (s, 3H). $^{13}$C-NMR (100 MHz, $CDCl_3$): δ 198.1, 170.4, 118.8, 75.7, 38.9, 38.2, 37.2, 29.3, 23.6, 20.6, 20.5, 18.4, 15.6, 15.0.

Odor profile: Fruity, woody, Cashmeran-type (Cashmeran includes floral fruity notes)

Example 5

2,4,4-trimethyl-2,3,4,6,7,8-hexahydro-5H-chromen-5-one

Odor profile: sweet, sandal, woody

Example 6

3,4,4-trimethyl-2,3,4,6,7,8-hexahydro-5H-chromen-5-one

Synthesized in 2 steps from cyclohexane-1,3-dione and 3-methyl-2-methylenebutan-1-ol as per method Q.

Odor profile: Strong minty, woody, animalic in background

Example 7

4,4,6,8-tetramethyl-2,3,4,6,7,8-hexahydro-5H-chromen-5-one

Synthesized from 4,6-dimethylcyclohexane-1,3-dione and 3-methylbut-3-en-1-ol as per method Q.

Odor profile: minty, dry, woody

Example 8

6-(cyclopropylmethyl)-4,4-dimethyl-2,3,4,6,7,8-hexahydro-5H-chromen-5-one

Synthesized in one step from 4,4-dimethyl-2,3,4,6,7,8-hexahydro-5H-chromen-5-one and (bromomethyl)cyclopropane $^1$H-NMR (300 MHz, $CDCl_3$): δ 4.08-4.01 (m, 2H), 2.38-2.34 (m, 2H), 2.2-2.05 (m, 2H), 1.74-1.56 (m, 4H), 1.37-1.35 (m, 1H), 1.25 (s, 6H), 0.68-0.66 (m, 1H), 0.45-0.37 (m, 2H), 0.07-0.01 (m, 2H). $^{13}$C-NMR (100 MHz, $CDCl_3$): δ 199.8, 169.4, 119.1, 64.1, 47.0, 40.0, 35.0, 29.5, 28.1 (2C), 27.5, 25.3, 8.95. 5.36, 4.24.

Odor profile: Woody, ambery

Example 9

6-isobutyl-4,4-dimethyl-2,3,4,6,7,8-hexahydro-5H-chromen-5-one

Synthesized in one step from 4,4-dimethyl-2,3,4,6,7,8-hexahydro-5H-chromen-5-one and 1-bromo-2-methylpropane, yield=15%

$^1$H-NMR (300 MHz, $CDCl_3$): δ 4.09-3.99 (m, 2H), 2.40-2.34 (m, 2H), 2.25-2.16 (m, 1H), 2.23-1.99 (m, 1H), 1.97-1.61 (m, 4H), 1.58-1.33 (m, 2H), 1.27 (s, 6H), 0.94 (d, J=6.6 Hz, 3H), 0.89 (d, J=6.3 Hz, 3H).

Odor profile: Dry woody ambery

Example 10

2,2,3,3-tetramethyl-3,5,6,7-tetrahydrobenzofuran-4(2H)-one $^1$H-NMR (400 MHz, $CDCl_3$): δ 2.27 (t, J=6.4 Hz, 2H), 2.22 (t, J=6.8 Hz, 2H), 1.91-1.93 (m, 2H), 1.21 (s, 6H), 1.10 (s, 6H).

Odor profile: Woody, musky

Composition Evaluation Example 1

In the following invention, example (A) containing the compound from Example 2 (4,4,6-trimethyl-2,3,4,6,7,8-hexahydro-5H-chromen-5-one) and a comparative example B containing commercial compound ethyl safranate illustrate composition evaluation study in a woody accord fragrance for use in shampoo (C=blank), IPM=Isopropyl myristate.

| Raw Materials (parts by weight) | Examples | | |
|---|---|---|---|
| | A | B | C |
| Kambernoir SHK | 10 | 10 | 10 |
| Bacdanol | 8 | 8 | 8 |
| Cedryl methyl ketone | 8 | 8 | 8 |
| Eugenyl acetate | 0.5 | 0.5 | 0.5 |
| Iso E Super ® | 40 | 40 | 40 |
| Isobornyl acetate | 10 | 10 | 10 |
| Iso bornyl cyclo hexenol (IBCH) | 8 | 8 | 8 |
| p-Tertiary butyl cyclohexyl acetate (PTBCA) | 10 | 10 | 10 |
| 4,4,6-trimethyl-2,3,4,6,7,8-hexahydro-5H-chromen-5-one as 10% w/w solution in IPM | 5.5 | 0 | 0 |
| Ethyl safranate as 10% w/w in IPM | 0 | 5.5 | 0 |
| IPM | 0 | 0 | 5.5 |
| Total | 100 | 100 | 100 |

Introduction of 5.5% weight by weight of 4,4,6-trimethyl-2,3,4,6,7,8-hexahydro-5H-chromen-5-one as 10% w/w solution in IPM gives nice rounded, powerful woody effect. On the other hand, when ethyl safranate 10% weight by weight in IPM is used in the above accord, only an average rosy effect is observed.

Composition Evaluation Example 2

In another evaluation involving a rose accord fragrance for use in shampoo, when compound from Example 2 (4,4,6-trimethyl-2,3,4,6,7,8-hexahydro-5H-chromen-5-one) was included in the rose accord, it imparted an excellent and very powerful rosy and spicy note to the accord; which was much stronger than the effect imparted by ethyl safranate under the same conditions.

The invention claimed is:

1. Compounds of formula A or of formula B

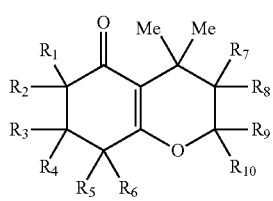

A

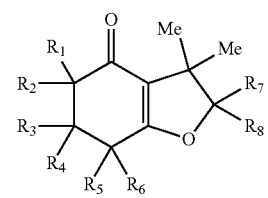

B wherein $R_1$, $R_2$, $R_3$, $R_4$, $R_5$, $R_6$, $R_7$, $R_8$, $R_9$, and $R_{10}$ are independently selected from a group consisting of hydrogen, C1 to C5 alkyl or C1 to C5 alkenyl, with the proviso that compounds of formula A don't include compound of formula A-exc, and

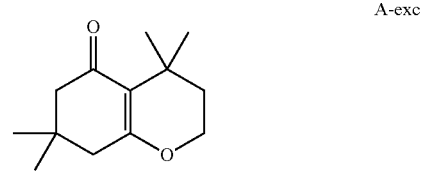

A-exc compounds of formula B don't include compounds of formulae B-exc1, B-exc2 and B-exc3

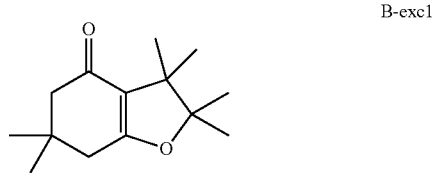

B-exc1

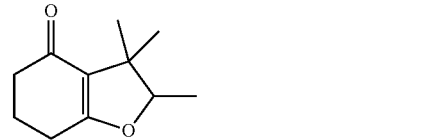

B-exc2

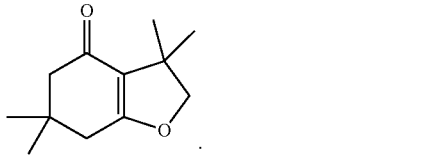

B-exc3

2. Compounds of formula A or of formula B according to claim 1 wherein $R_1$, $R_2$, $R_3$, $R_4$, $R_5$, $R_6$, $R_7$, $R_8$, $R_9$, and $R_{10}$ are independently selected from a group consisting of hydrogen, methyl, ethyl, isopropyl, n-propyl, n-butyl, t-butyl, isobutyl, n-pentyl, cyclopropylmethyl, cyclobutylmethyl, cyclobutyl, cyclopentyl, an allyl group, 3-methylbut-2-en-1-yl, 3-methylbut-3-en-1-yl, but-3-en-1-yl or 2-methylallyl.

3. Compounds of formula A or of formula B according to claim 1

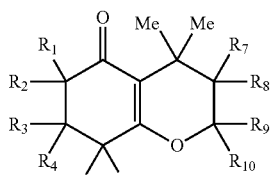

A

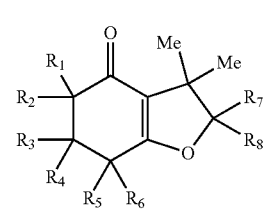

B wherein $R_1$, $R_2$, $R_3$, $R_4$, $R_5$, $R_6$, $R_7$, $R_8$, $R_9$, and $R_{10}$ are independently selected from a group consisting of hydrogen, methyl, ethyl, isopropyl, n-propyl, n-butyl or t-butyl groups.

4. Compounds according to claim 1 selected from the following compounds:
1) 4,4-dimethyl-2,3,4,6,7,8-hexahydro-5H-chromen-5-one;
2) 4,4,6-trimethyl-2,3,4,6,7,8-hexahydro-5H-chromen-5-one;
3) 6-ethyl-4,4-dimethyl-2,3,4,6,7,8-hexahydro-5H-chromen-5-one;
4) 3,3,4,4-tetramethyl-2,3,4,6,7,8-hexahydro-5H-chromen-5-one;
5) 2,3,3,4,4-pentamethyl-2,3,4,6,7,8-hexahydro-5H-chromen-5-one;
6) 2,4,4-trimethyl-2,3,4,6,7,8-hexahydro-5H-chromen-5-one;
7) 3,3,4,4,6-pentamethyl-2,3,4,6,7,8-hexahydro-5H-chromen-5-one;
8) 3,4,4-trimethyl-2,3,4,6,7,8-hexahydro-5H-chromen-5-one;
9) 4,4,6,8-tetramethyl-2,3,4,6,7,8-hexahydro-5H-chromen-5-one;
10) 4,4,6,7,7-pentamethyl-2,3,4,6,7,8-hexahydro-5H-chromen-5-one;
11) 6-(cyclopropylmethyl)-4,4-dimethyl-2,3,4,6,7,8-hexahydro-5H-chromen-5-one; or
12) 6-isobutyl-4,4-dimethyl-2,3,4,6,7,8-hexahydro-5H-chromen-5-one.

5. Compounds according to claim 1 selected from the following compounds:
13) 3,3-dimethyl-3,5,6,7-tetrahydrobenzofuran-4(2H)-one;
14) 3,3,5-trimethyl-3,5,6,7-tetrahydrobenzofuran-4(2H)-one;
15) 3,3,7-trimethyl-3,5,6,7-tetrahydrobenzofuran-4(2H)-one;
16) 5-ethyl-3,3-dimethyl-3,5,6,7-tetrahydrobenzofuran-4(2H)-one;
17) 2,2,3,3-tetramethyl-3,5,6,7-tetrahydrobenzofuran-4(2H)-one;
18) 2,2,3,3,5-pentamethyl-3,5,6,7-tetrahydrobenzofuran-4(2H)-one;
19) 2,2,3,3,7-pentamethyl-3,5,6,7-tetrahydrobenzofuran-4(2H)-one; or
20) 5-ethyl-2,2,3,3-tetramethyl-3,5,6,7-tetrahydrobenzofuran-4(2H)-one.

6. Mixture of compounds of formula A together with compounds of formula B according to claim 1.

7. Odorant consisting of a compound according to claim 1.

8. Fragrance, flavor and/or deodorizing/masking composition comprising a compound according to claim 1.

9. Fragrance, flavor and/or deodorizing/masking composition according to claim 8 wherein the content of the compound of formula A or formula B is at least 0.1 wt. %.

10. Fragrance, flavor and/or deodorizing/masking composition according to claim 8 wherein the content of the compound of formula A or formula B is at least 1 wt. %.

11. Fragrance, flavor and/or deodorizing/masking composition according to claim 8 wherein the content of the compound of formula A and formula B is below 50 wt. %.

12. Fragrance, flavor and/or deodorizing/masking composition according to claim 8 wherein the content of the compound of formula A and formula B is below 25 wt. %.

13. Fragrance, flavor and/or deodorizing/masking composition according to claim 8 comprising at least one ester and/or one alcohol, wherein the total content of the compound(s) of formula (A) and of formula (B) together with the ester(s) and alcohol(s) is superior to 25 wt %.

14. Fragrance, flavor and/or deodorizing/masking composition according to claim 8 comprising at least one ester and/or one alcohol, wherein the total content of the compound(s) of formula (A) and of formula (B) together with the ester(s) and alcohol(s) is superior to 50 wt %.

15. The fragrance, flavor and/or deodorizing/masking composition according to claim 8, which is formulated as a perfumed or flavored product.

16. The compound according to claim 1 in a perfumed or flavored product.

17. The mixture according to claim 6 in a perfumed or flavored product.

\* \* \* \* \*